US012232241B2

(12) United States Patent
Kim et al.

(10) Patent No.: US 12,232,241 B2
(45) Date of Patent: Feb. 18, 2025

(54) INDUCTION HEATING DEVICE AND METHOD FOR CONTROLLING INDUCTION HEATING DEVICE

(71) Applicant: LG ELECTRONICS INC., Seoul (KR)

(72) Inventors: Hanna Kim, Seoul (KR); Kyelyong Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 280 days.

(21) Appl. No.: 17/063,399

(22) Filed: Oct. 5, 2020

(65) Prior Publication Data

US 2021/0105871 A1 Apr. 8, 2021

(30) Foreign Application Priority Data

Oct. 7, 2019 (KR) ........................ 10-2019-0124031

(51) Int. Cl.
*H05B 6/06* (2006.01)
*H05B 6/12* (2006.01)

(52) U.S. Cl.
CPC ........... *H05B 6/065* (2013.01); *H05B 6/1245* (2013.01)

(58) Field of Classification Search
CPC ......... H05B 6/065; H05B 6/1245; H05B 6/12
See application file for complete search history.

(56) References Cited

U.S. PATENT DOCUMENTS

| | | | | |
|---|---|---|---|---|
| 2006/0072931 A1* | 4/2006 | Asakura | G03G 15/205 399/33 |
| 2008/0087661 A1 | 4/2008 | Haag et al. | |

(Continued)

FOREIGN PATENT DOCUMENTS

| | | | | |
|---|---|---|---|---|
| EP | 1878309 A1 | 1/2008 | |
| EP | 2506663 A1 | 10/2012 | |
| EP | 2693838 A1 * | 2/2014 | H05B 6/065 |
| EP | 3282815 A1 * | 2/2018 | H05B 6/065 |
| EP | 3413687 A1 | 12/2018 | |
| JP | H06275374 A | 9/1994 | |
| JP | 3054840 B2 * | 6/2000 | H05B 6/12 |
| JP | 2011028925 A | 2/2011 | |
| JP | 2015225797 A | 12/2015 | |
| KR | 10-1735754 B1 | 5/2017 | |
| KR | 1020170075913 A | 7/2017 | |

OTHER PUBLICATIONS

Microcomputer, Mar. 17, 2023, Wikipedia, <https://en.wikipedia.org/wiki/Microcomputer> (Year: 2023).*

(Continued)

*Primary Examiner* — Dana Ross
*Assistant Examiner* — Kevin Guanhua Wen
(74) *Attorney, Agent, or Firm* — Bryan Cave Leighton Paisner LLP

(57) ABSTRACT

A method for controlling an induction heating device includes acquiring a temperature value of a high-power working coil, when an absolute value of a difference between a first final driving frequency of a first working coil and a second final driving frequency of a second working coil is equal to or greater than a predetermined noise avoidance value and when a final driving frequency of a low-power working coil differs from a target frequency of the low-power working coil, determining whether the temperature value satisfies a predetermined output change condition, setting a required power value of the high-power working coil to a predetermined minimum power value when the temperature value satisfies the output change condition, and determining the first final driving frequency of the first working coil and the second final driving frequency of the second working coil again.

20 Claims, 11 Drawing Sheets

(56) References Cited

U.S. PATENT DOCUMENTS

| | | | | |
|---|---|---|---|---|
| 2010/0237065 | A1 | 9/2010 | Cho et al. | |
| 2011/0139770 | A1* | 6/2011 | Dohmeier | H05B 6/065 219/660 |
| 2016/0150597 | A1* | 5/2016 | Yun | H05B 6/1272 219/662 |
| 2018/0242407 | A1* | 8/2018 | Iida | H05B 1/0202 |
| 2020/0178357 | A1 | 6/2020 | Christiansen et al. | |
| 2021/0092805 | A1* | 3/2021 | Bunya | H05B 6/1209 |

OTHER PUBLICATIONS

Machine translation of JP 3054840 B2 performed on Apr. 11, 2024, Kenji et al. (Year: 2000).*

* cited by examiner

RELATED ART

INDUCTION HEATING DEVICE AND METHOD FOR CONTROLLING INDUCTION HEATING DEVICE

CROSS-REFERENCE TO RELATED APPLICATION

This application claims priority to and the benefit of Republic of Korea Patent Application No. 10-2019-0124031 filed on Oct. 7, 2019, the disclosure of which is incorporated herein by reference in its entirety.

BACKGROUND

1. Field

Disclosed herein is an induction heating device and a method for controlling the induction heating device that may help solve a problem associated with a reduction in an output power value while a working coil is driven.

2. Background

Various types of cooking apparatuses are used to heat food at homes or restaurants. Conventionally, gas stoves fueled by gas have been widely used. However, in recent years, apparatuses for heating a cooking vessel using electricity are used.

Methods for heating a vessel using electricity are broadly classified as a resistance heating method and an induction heating method. The resistance heating method is a method by which a vessel is heated by thermal energy that is generated when electric energy is supplied to a metallic resistance wire, or a non-metallic heating element such as silicon carbide. The induction heating method is a method by which a metallic vessel itself is heated by eddy currents that are generated in the vessel, using a magnetic field that is generated around a working coil when electric energy is supplied to the working coil.

A theory about the induction heating method is specifically described as follows. As power is supplied to an induction heating device, a high-frequency voltage having predetermined magnitude is supplied to a working coil. Accordingly, an induction field is produced around the working coil in the induction heating device. When a magnetic line of force of the produced induction field passes through a bottom of a metallic vessel placed on an upper portion of the working coil, eddy currents are generated at an inside of the bottom of the vessel. As the generated eddy currents flow through the vessel, the vessel itself is heated.

The induction heating device may include two or more heating areas, and two or more working coils corresponding to the heating areas. For example, when a user places a vessel respectively in two heating areas and cooks a load of food in the vessels at the same time, using an induction heating device with two heating areas, power for driving is supplied respectively to two working coils. Each working coil is driven at a driving frequency corresponding to a required power value set by the user.

FIG. 1 is a graph showing a relationship between a driving frequency of a working coil and an output power value of the same.

The driving frequency of the working coil, as illustrated in FIG. 1, is inversely proportional to an output power value of the working coil. For example, when the driving frequency of the working coil increases from fa to fb, the output power value of the working coil decreases from Pa to Pb.

That is, an increase in the driving frequency of the working coil results in a decrease in the output power value of the working coil. Accordingly, an amount of thermal energy due to eddy currents generated in a vessel is reduced.

In the case of an absolute value of a difference between driving frequencies of two working coils is included in a range of audio frequencies (e.g., 2 kHz to 20 kHz) when the two working coils are driven at the same time, interference noise caused by the driving of the working coils may occur. The interference noise causes inconvenience to a user and may cause the user to think that a failure of the induction heating device has occurred.

To remove interference noise caused by the driving of two or more working coils, the driving frequencies of the working coils may be adjusted such that an absolute value of a difference between the driving frequencies of the working coils is out of a range of audio frequencies. For example, according to Korean Patent No. 10-1735754, switching elements respectively connected to a plurality of working coils in an induction heating device are consecutively turned on/off on the basis of time division, and thus even when the plurality of working coils are driven simultaneously, interference noise is prevented.

FIG. 2 is a graph showing a change in output power values when a driving frequency of a working coil is adjusted to reduce interference noise generated at the time of driving of two working coils.

In the embodiment of FIG. 2, a driving frequency of a first working coil, which corresponds to P1—a required power value of the first working coil, is f1, a driving frequency of a second working coil, which corresponds to P2—a required power value of the second working coil, is f2, and an absolute value of a difference between f1 and f2 is included in a range of audio frequencies (e.g., 2 kHz to 20 kHz). Accordingly, when the first working coil and the second working coil are driven at the same time, interference noise may occur.

To remove the interference noise, the driving frequency of the second working coil may be adjusted from f2 to f3. When the driving frequency of the second working coil increases to f3, an absolute value of a difference between f1 and f3 is out of the range of audio frequencies. Accordingly, interference noise does not occur.

However, the increase in the driving frequency of the second working coil to f3 leads to a decrease in an output power value of the second working coil from P2 to P3, and an amount of thermal energy generated in a vessel by the second working coil is reduced. Thus, cooking time is lengthened, causing inconvenience to a user and may cause the user to think that the induction heating device is not operating correctly.

SUMMARY

The present disclosure is directed to an induction heating device and a method for controlling the same that may help solve a problem associated with a reduction in an output power value of a working coil when a driving frequency of the working coil is adjusted to remove interference noise.

Aspects of the present disclosure are not limited to the above-described ones. Additionally, other aspects and advantages that have not been mentioned may be clearly understood from the following description and may be more clearly understood from embodiments. Further, it will be understood that the aspects and advantages of the present disclosure may be realized via means and combinations thereof that are described in the appended claims.

A method for controlling an induction heating device according to one embodiment may include acquiring a temperature value of a high-power working coil, when an absolute value of a difference between a first final driving frequency of a first working coil and a second final driving frequency of a second working coil is equal to or greater than a predetermined noise avoidance value and when a final driving frequency of a low-power working coil differs from a target frequency of the low-power working coil, determining whether the temperature value satisfies a predetermined output change condition, setting a required power value of the high-power working coil to a predetermined minimum power value when the temperature value satisfies the output change condition, and determining the first final driving frequency of the first working coil and the second final driving frequency of the second working coil again.

In one embodiment, the output change condition is satisfied when the temperature value is equal to or greater than a predetermined reference temperature value.

In one embodiment, the output change condition is satisfied when the temperature value is maintained within a range of predetermined reference temperatures for a predetermined reference period.

In one embodiment, the method may further include determining a first target frequency of the first working coil based on a required power value of the first working coil, determining a second target frequency of the second working coil based on a required power value of the second working coil, calculating an absolute value of a difference between the first target frequency and the second target frequency, and determining a driving mode of the induction heating device based on the absolute value of the difference between the first target frequency and the second target frequency.

In one embodiment, the step of determining a driving mode based on the absolute value of the difference between the first target frequency and the second target frequency may include determining the driving mode as a coupling mode when the absolute value of the difference between the first target frequency and the second target frequency is equal to or greater than a predetermined first reference value and less than a predetermined second reference value, determining the driving mode as a dividing mode when the absolute value of the difference between the first target frequency and the second target frequency is equal to or greater than the second reference value and is less than or equal to a predetermined third reference value, and determining the driving mode as a normal mode when the absolute value of the difference between the first target frequency and the second target frequency is less than the first reference value or greater than the third reference value.

In one embodiment, when the driving mode is the coupling mode, the first final driving frequency and the second final driving frequency may be set to the same value, when the driving mode is the dividing mode, a difference between the first final driving frequency and the second final driving frequency may be set to equal to or greater than the noise avoidance value, and when the driving mode is the normal mode, the first final driving frequency is set equal to the first target frequency, and the second final driving frequency is set equal to the second target frequency.

In one embodiment, the method may further include driving the first working coil and the second working coil at a predetermined adjusted frequency, and adjusting a driving frequency of the first working coil to the first final driving frequency and adjusting a driving frequency of the second working coil to the second final driving frequency.

An induction heating device according to one embodiment may include a first working coil corresponding to a first heating area, a second working coil corresponding to a second heating area, and a controller configured to respectively drive the first working coil and the second working coil according to an instruction to drive the first working coil and an instruction to drive the second working coil. The controller may acquire a temperature value of a high-power working coil when an absolute value of a difference between a first final driving frequency of the first working coil and a second final driving frequency of the second working coil is equal to or greater than a predetermined noise avoidance value and a final driving frequency of a low-power working coil differs from a target frequency of the low-power working coil, may determine whether the temperature value satisfies a predetermined output change condition, may set a required power value of the high-power working coil to a predetermined minimum power value when the temperature value satisfies the output change condition, and may determine a first final driving frequency of the first working coil and a second final driving frequency of the second working coil again.

In one embodiment, the output change condition is satisfied when the temperature value is equal to or greater than a predetermined reference temperature value.

In one embodiment, the output change condition is satisfied when the temperature value is maintained within a range of predetermined reference temperatures for a predetermined reference period.

In one embodiment, the controller may determine a first target frequency of the first working coil, based on a required power value of the first working coil, may determine a second target frequency of the second working coil, based on a required power value of the second working coil, may calculate an absolute value of a difference between the first target frequency and the second target frequency, and may determine a driving mode of the induction heating device, based on the absolute value of the difference between the first target frequency and the second target frequency.

In one embodiment, the controller may determine the driving mode as a coupling mode when the absolute value of the difference between the first target frequency and the second target frequency is equal to or greater than a predetermined first reference value and less than a predetermined second reference value, may determine the driving mode as a dividing mode when the absolute value of the difference between the first target frequency and the second target frequency is equal to or greater than the second reference value and is less than or equal to a predetermined third reference value, and may determine the driving mode as a normal mode when the absolute value of the difference between the first target frequency and the second target frequency is less than the first reference value or greater than the third reference value.

In one embodiment, when the driving mode is the coupling mode, the first final driving frequency and the second final driving frequency may be set to the same value, when the driving mode is the dividing mode, a difference between the first final driving frequency and the second final driving frequency may be set equal to or greater than the noise avoidance value, and when the driving mode is the normal mode, the first final driving frequency may be set equal to the first target frequency and the second final driving frequency may be set equal to the second target frequency.

In one embodiment, the controller may drive the first working coil and the second working coil at a predetermined adjusted frequency, and may respectively adjust driving frequencies of the first working coil and the second working coil to the first final driving frequency and the second final driving frequency.

According to the present disclosure, a problem associated with a reduction in an output power value of a working coil may be solved when a driving frequency of the working coil is adjusted to remove interference noise during the driving of an induction heating device.

BRIEF DESCRIPTION OF DRAWINGS

The accompanying drawings constitute a part of this specification, illustrate one or more embodiments of the present disclosure, and together with the specification, explain the present disclosure, wherein.

DETAILED DESCRIPTION

Figure 1:
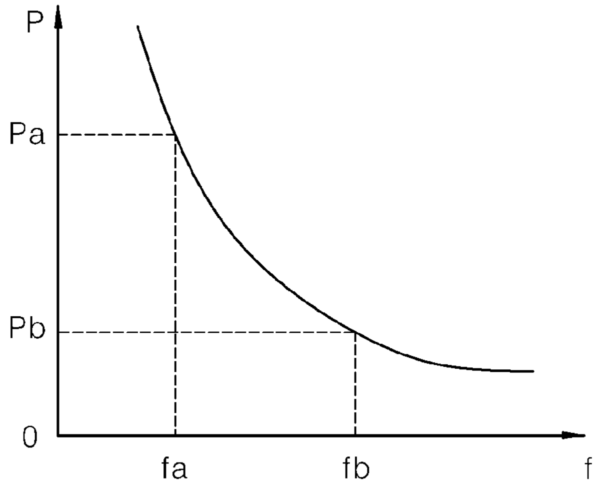
FIG. 1 RELATED ART
FIG. 1 is a graph showing a relationship between a driving frequency of a working coil and an output power value of the same.
Figure 2:
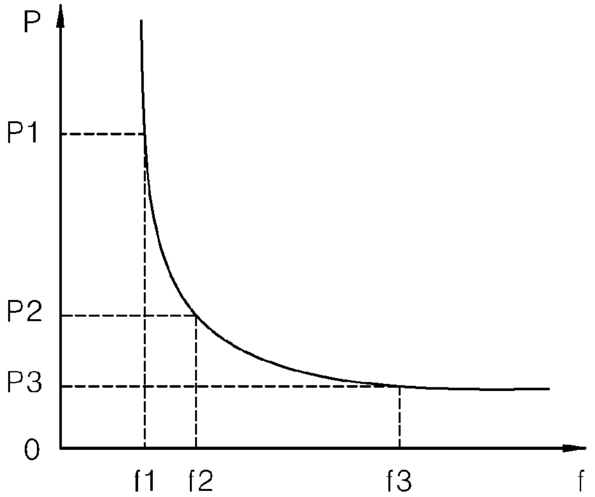
FIG. 2 is a graph showing a change in output power values when a driving frequency of a working coil is adjusted to reduce interference noise generated at the time of driving of two working coils.

The above-described aspects, features and advantages are specifically described with reference to the accompanying drawings hereunder such that one having ordinary skill in the art to which the present disclosure pertains may easily implement the technical spirit of the disclosure. During description in the disclosure, detailed description of known technologies in relation to the disclosure is omitted if it is deemed to make the gist of the present disclosure unnecessarily vague. Below, preferred embodiments according to the disclosure are described with reference to the accompanying drawings. Throughout the drawings, identical reference numerals may denote identical or similar components.

Figure 3:
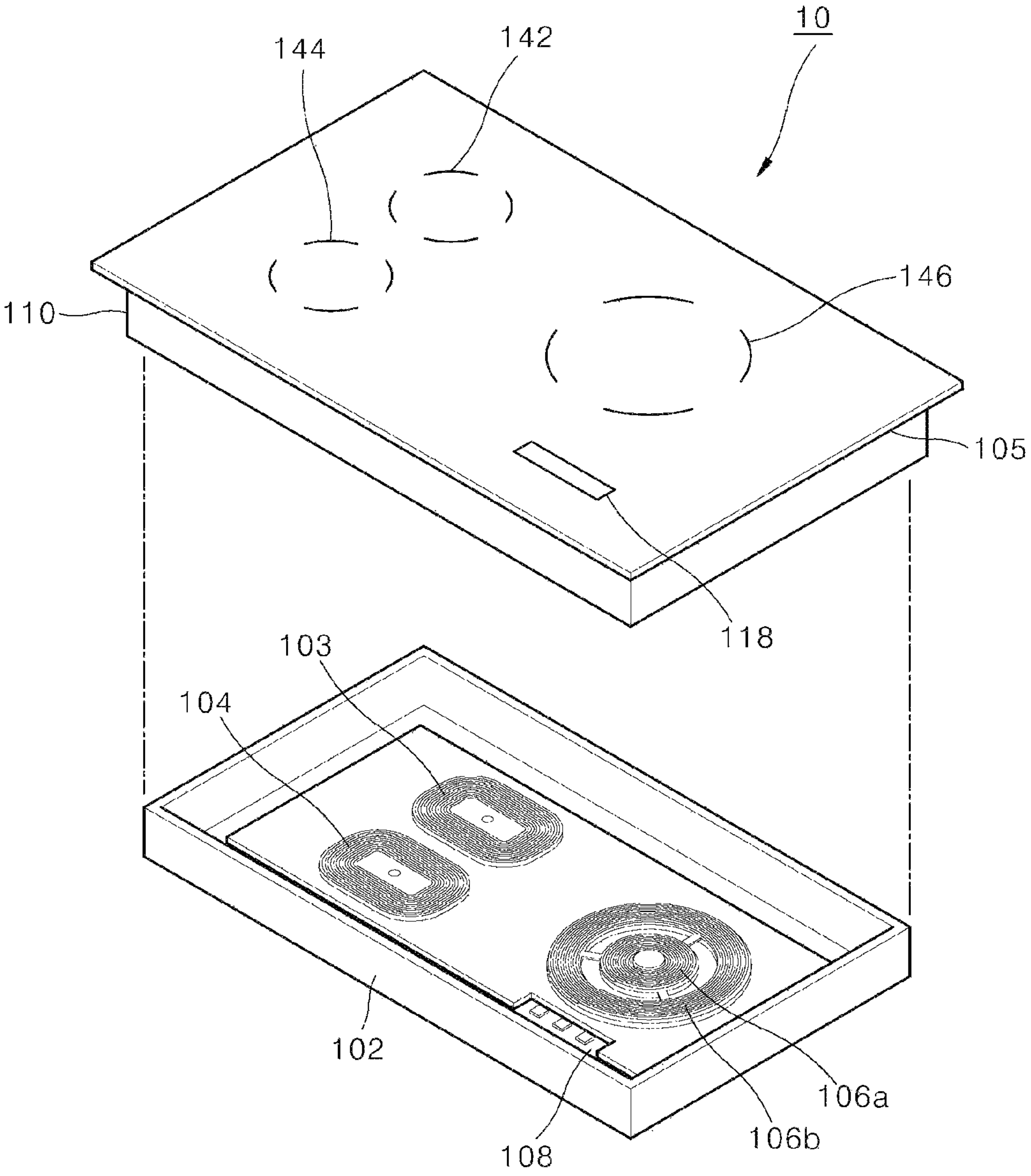
FIG. 3 is a perspective view of an exemplary induction heating device.

FIG. 3 is a perspective view of an exemplary induction heating device.

Referring to FIG. 3, the exemplary induction heating device 10 may include a case 102 forming an exterior of the induction heating device 10, and a cover plate 110 coupled to the case 102 and configured to seal the case 102.

The cover plate 110 having less surface than an upper plate 105 may be coupled to an upper surface of the case 102 to seal a space formed in the case 102 from the outside. The upper plate 105, on which an object to be heated—i.e. a vessel for cooking food—is placed, may be formed on the upper surface of the cover plate 110. The upper plate 105 may be made of a variety of materials, e.g. tempered glass such as ceramic glass.

Working coils 103, 104, 106*a*, 106*b* for heating a vessel may be disposed in the case 102's inner space formed by the coupled cover plate 110 and case 102. Specifically, a first working coil 103, a second working coil 104, and a third working coil 106*a*, 106*b* may be disposed in the case 102.

Conductive wire, made of a conductive material such as copper, may be wound many times to respectively manufacture the first working coil 103, the second working coil 104 and the third working coil 106*a*, 106*b*. In FIG. 3, the first working coil 103 and the second working coil 104 may have a rectangular shape with its edges curved, and the third working coil 106*a*, 106*b* may have a circular shape. However, the shape of each of the working coils may vary depending on embodiments.

Additionally, the number and disposition of working coils in the induction heating device 10 may vary depending on embodiments.

In one embodiment, the third working coil 106*a*, 106*b* may include two working coils—i.e. an inner coil 106*a* and an outer coil 106*b*. FIG. 3 shows the third working coil 106*a*, 106*b* including two coils. However, the number of coils constituting the third working coil, and the number of coils constituting the inner coil and the outer coil may vary depending on embodiments.

As an example, the third working coil may include four coils. In this case, two coils disposed at an inner side of the third working coil may be defined as an inner coil and the remaining two coils disposed at an outer side of the third working coil may be defined as an outer coil. As another example, three coils disposed at the inner side of the third working coil may be defined as an inner coil, and the remaining coil disposed at the outer side of the third working coil may be defined as an outer coil.

Additionally, a first heating area 142, a second heating area 144, and a third heating area 146 may be respectively displayed on a surface of the upper plate 105 of the cover plate 110. Positions of the first heating area 142, the second heating area 144 and the third heating area 146 may respectively correspond to those of the first working coil 103, the second working coil 104 and the third working coil 106*a*, 106*b*.

Further, an interface 108 allowing a user to supply power or to adjust output of the working coils 103, 104, 106*a*, 106*b*, or configured to display information on the induction heating device 10 may be disposed in the inner space of the case 102. In one embodiment, the interface 108 according to the present disclosure may be implemented as a touch panel capable of inputting and displaying information as a result of a touch. Description of the interface 108 is provided hereunder. However, the interface 108 may be implemented in different forms and structures depending on embodiments.

Furthermore, a manipulation area 118, disposed at a position corresponding to that of the interface 108, may be formed on the upper plate 105 of the cover plate 110. In the manipulation area 118, a specific character, a specific image and the like for the user's manipulation or a display of information may be displayed. The user may perform a desired manipulation by manipulating (e.g. touching) a specific point of the manipulation area 118 considering a character or an image displayed in the manipulation area 118. For example, to input an instruction for driving a working coil corresponding to a heating area, the user may set a heating level of a vessel placed on at least one of the first heating area 142, the second heating area 144 and the third heating area 146 by touching the manipulation area 118. Additionally, as a result of the user's manipulation or operation of the induction heating device 10, various pieces of information outputted by the interface 108 may be displayed through the manipulation area 118.

Further, a power supply circuit (not illustrated) for supplying power to the working coils 103, 104, 106*a*, 106*b* or the interface 108 may be disposed in the inner space of the case 102. The power supply circuit may electrically connect to the working coils 103, 104, 106*a*, 106*b* or the interface 108, and may convert power, supplied by an external power supply, into power appropriate for driving of the working coils 103, 104, 106*a*, 106*b* or the interface 108 and may supply the converted power to the same.

FIG. 3 shows an embodiment in which three working coils 103, 104, 106*a*, 106*b* are disposed in the inner space of the case 102. In another embodiment, a single working coil or four or more working coils may be disposed in the inner space of the case 102.

Though not illustrated in FIG. 3, a controller (not illustrated) may be disposed in the inner space of the case 102. The controller (not illustrated) may control driving of the working coils 103, 104, 106*a*, 106*b* on the basis of the user's instruction for heating (e.g. an instruction to start driving, an instruction to end driving, an instruction to adjust a heating level and the like) inputted through the interface 108.

After placing a vessel in a desired heating area among the first heating area 142, the second heating area 144 and the third heating area 146, the user may give an instruction for heating and for setting a heating level of the heating area, in which the vessel is placed, through the manipulation area 118.

The user's instruction for heating, inputted through the manipulation area 118, may be inputted to the controller (not illustrated) as an instruction for driving a working coil corresponding to the heating area in which the user places the vessel. The controller (not illustrated), having received the instruction for driving, may drive the working coil subject to the instruction for driving to heat the vessel.

Figure 4:
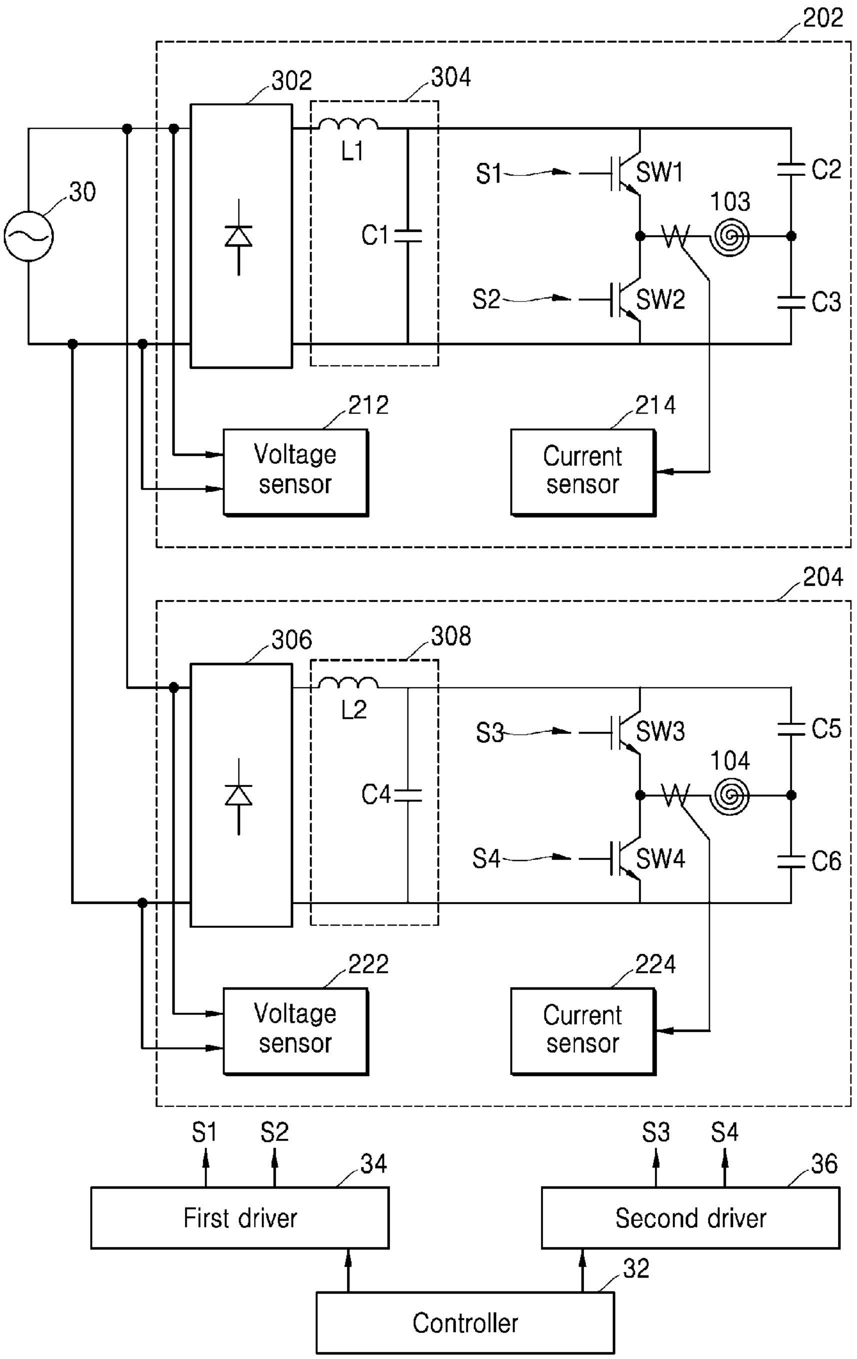
FIG. 4 is a circuit diagram of an exemplary induction heating device.

FIG. 4 is a circuit diagram of an exemplary induction heating device.

FIG. 4 shows a circuit diagram in the case of an exemplary induction heating device provided with two working coils—i.e. the first working coil 103 and the second working coil 104. However, the exemplary induction heating device, as described above, may be provided with two or more working coils, and a below-described method for controlling an induction heating device may also be applied to an induction heating device provided with two or more working coils.

Referring to FIG. 4, the exemplary induction heating device may include two heating modules, i.e., a first heating module 202 and a second heating module 204. The first heating module 202 and the second heating module 204 may convert AC power supplied by an external power supply 30 and may supply power for driving to each of the first working coil 103 and the second working coil 104.

The first heating module 202 may include a rectifier 302 and a smoother 304. The rectifier 302 may rectify an AC voltage, supplied by the external power supply 30, and may output a rectified voltage. The smoother 304 may include a first inductor (L1) and a first capacitor (C1), and may convert the rectified voltage, outputted from the rectifier 302, into a DC voltage, and may output the DC voltage.

The second heating module 204 may include a rectifier 306 and a smoother 308. The rectifier 306 may rectify an AC voltage, supplied by the external power supply 30, and may output a rectified voltage. The smoother 308 may include a second inductor (L2) and a fourth capacitor (C4), and may convert the rectified voltage, outputted from the rectifier 306, into a DC voltage, and may output the DC voltage.

Additionally, the first heating module 202 may include a plurality of switching elements (SW1 and SW2) and a plurality of capacitors (C2 and C3).

A first switching element (SW1) and a second switching element (SW2) may connect to each other in series and may be turned on and turned off alternatively according to a first switching signal (S1) and a second switching signal (S2) outputted from a first driver 34. In the present disclosure, the turn-on and the turn-off operations of the switching elements are referred to as a "switching operation".

A second capacitor (C2) and a third capacitor (C3) may connect to each other in series. The first switching element (SW1) and the second switching element (SW2) may connect to the second capacitor (C2) and the third capacitor (C3) in parallel.

The first working coil 103 may connect between a point, at which the first switching element (SW1) and the second switching element (SW2) connect, and a point, at which the second capacitor (C2) and the third capacitor (C3) connect. When the first switching signal (S1) and the second switching signal (S2) are respectively supplied to the first switching element (SW1) and the second switching element (SW2), and the first switching element (SW1) and the second switching element (SW2) perform switching operations, alternating current may be supplied to the first working coil 103, and a vessel may be inductively heated.

Further, the second heating module 204 may include a plurality of switching elements (SW3 and SW4) and a plurality of capacitors (C5 and C6).

A third switching element (SW3) and a fourth switching element (SW4) may connect to each other in series, and may be alternatively turned on and turned off according to a third switching signal (S3) and a fourth switching signal (S4) outputted from a second driver 36.

A fifth capacitor (C5) and a sixth capacitor (C6) may connect to each other in series. The third switching element (SW3) and the fourth switching element (SW4) may connect to the fifth capacitor (C5) and the sixth capacitor (C6) in parallel.

The second working coil 104 may connect between a point, at which the third switching element (SW3) and the fourth switching element (SW4) connect, and a point, at which the fifth capacitor (C5) and the sixth capacitor (C6) connect. When the third switching signal (S3) and the fourth switching signal (S4) are respectively supplied to the third switching element (SW3) and the fourth switching element (SW4), and the third switching element (SW3) and the fourth switching element (SW4) perform switching operations, alternating current may be supplied to the second working coil 104, and a vessel may be inductively heated.

The first driver 34 may supply the first switching signal (S1) and the second switching signal (S2) respectively to the first switching element (SW1) and the second switching element (SW2) that are included in the first heating module 202. Additionally, the second driver 36 may supply the third switching signal (S3) and the fourth switching signal (S4) respectively to the third switching element (SW3) and the fourth switching element (SW4) that are included in the second heating module 204. In one embodiment, the first switching signal (S1), the second switching signal (S2), the third switching signal (S3) and the fourth switching signal (S4) may be respectively a pulse width modulation (PWM) signal. A duty ratio of the first switching signal (S1) and the second switching signal (S2) may be determined based on a driving frequency of the first working coil 103, and a duty ratio of the third switching signal (S3) and the fourth switching signal (S4) may be determined based on a driving frequency of the second working coil 104.

The controller 32 may determine a driving frequency of the first working coil 103 and a driving frequency of the second working coil 104, and may output control signals corresponding to the determined driving frequencies. The controller 32 may be an electronic processor. The controller 32 may supply a control signal to each of the first driver 34 and the second driver 36 independently. Magnitude of power, i.e., an output power value, output by the first working coil 103 or the second working coil 104, may vary as a result of the controller 32's adjustment of the driving frequencies.

Voltage sensors 212, 222 may measure a magnitude of a voltage input to the heating modules 202, 204, i.e., a magnitude of an input voltage. Current sensors 214, 224 may measure a magnitude of electric current input to the first working coil 103 and the second working coil 104, i.e., a magnitude of input current.

The controller 32 may receive the magnitude of an input voltage from the voltage sensors 212, 222 and may receive the magnitude of input current from the current sensors 214, 224. The controller 32 may calculate output power values of the first working coil 103 and the second working coil 104, i.e., a power value supplied to a vessel by the first working coil 103 and the second working coil 104, using the received magnitude of the input voltage and input current. When the first working coil 103 and the second working coil 104 are driven, the controller 32 may calculate an output power value of each working coil in real time using various well-known methods.

Though not illustrated in FIG. 4, a temperature sensor may be disposed on one side of each of the first working coil 103 and the second working coil 104. The temperature sensor may measure a temperature in real time respectively at the first working coil 103 and the second working coil 104, and may deliver the measured temperature values to the controller 32.

After placing a vessel in a desired heating area, the user may set a heating level of the heating area, in which the vessel is placed, through the manipulation area 118, and may give an instruction to heat the vessel. The user's instruction for heating inputted through the manipulation area 118 may be inputted to the controller 32 as an instruction to drive a working coil corresponding to the heating area in which the vessel is placed. The controller 32, having received the instruction for driving, may drive the working coil subject to the instruction for driving, to heat the vessel.

In the case of a single working coil being driven, the above-described interference noise may not occur. However, in the case the where the user inputs an instruction to drive another working coil in the state where a single working coil is being driven, the interference noise may be made depending on the magnitude of a driving frequency of each working coil.

The controller 32 of the induction heating device according to the present disclosure may determine a target frequency of each working coil and may control a frequency to reduce interference noise on the basis of the determined target frequency of each working coil, in the case where the user inputs an instruction to drive another working coil in the state where a single working coil is being driven.

The target frequency of each working coil may denote a driving frequency of each working coil when an output power value of each working coil reaches a power value corresponding to a heating level set by the user, i.e., a required power value. For example, when the user sets a heating level of the first heating area to 5, a required power value of the first working coil 103 corresponding to the first heating area may be 4000 W. When the first working coil 103 is driven and outputs a power value of 4000 W, a driving frequency (e.g. 40 kHz) of the first working coil 103 may be defined as a target frequency of the first working coil 103.

The controller 32 of the induction heating device according to the present disclosure may determine a second target frequency of the second working coil 104 in the case where driving of the second working coil 104 is requested in a state where the first working coil 103 is being driven at a first target frequency. The controller 32 may determine a driving mode (a coupling mode, a dividing mode and a normal mode) of the induction heating device on the basis of the determined first target frequency and second target frequency.

The controller 32 may determine a final driving frequency of the first working coil 103 and the second working coil 104, based on the determined driving mode. The controller 32 may drive each working coil based on the determined final driving frequency. When the first working coil 103 and the second working coil 104 are driven respectively at the final diving frequency, interference noise, which is generated when two working coils are driven at the same time, may be removed.

A frequency control method for removing interference noise of the induction heating device according to the present disclosure is described hereunder with reference to the accompanying drawings. The frequency control method may be performed by the controller 32 according to instructions stored in a memory. Below, f1 denotes a driving frequency of the first working coil 103, and f2 denotes a driving frequency of the second working coil 104. Additionally, t denotes a driving period of each working coil.

Figure 5:
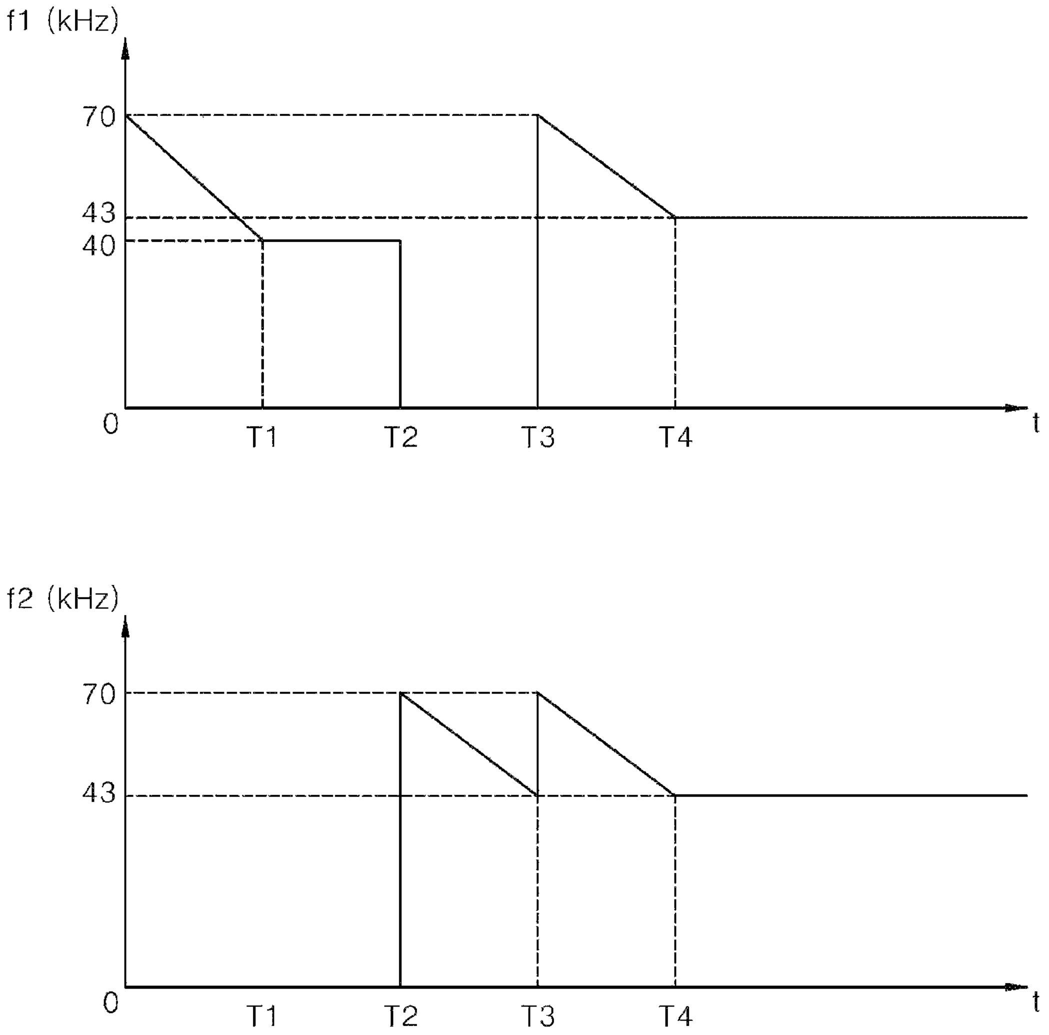
FIG. 5 is a graph for describing a process of controlling driving frequencies of a first working coil and a second working coil when an exemplary induction heating device is driven in a coupling mode.
Figure 6:
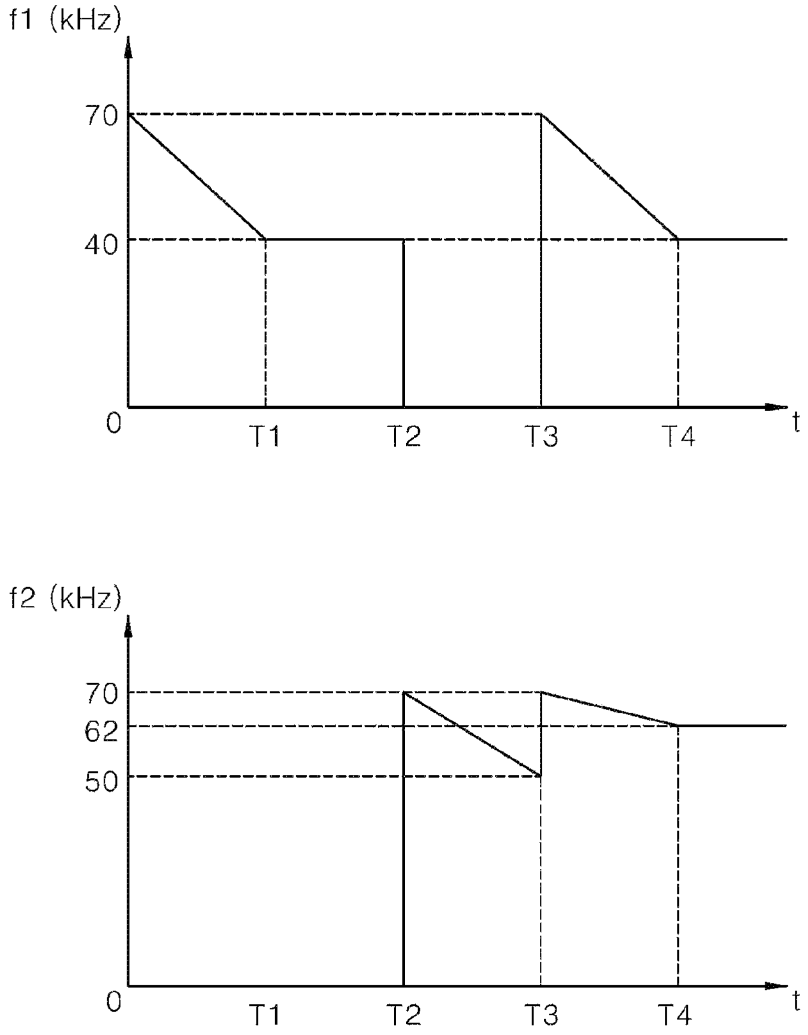
FIG. 6 is a graph for describing a process of controlling driving frequencies of a first working coil and a second working coil when an exemplary induction heating device is driven in a dividing mode.
Figure 7:
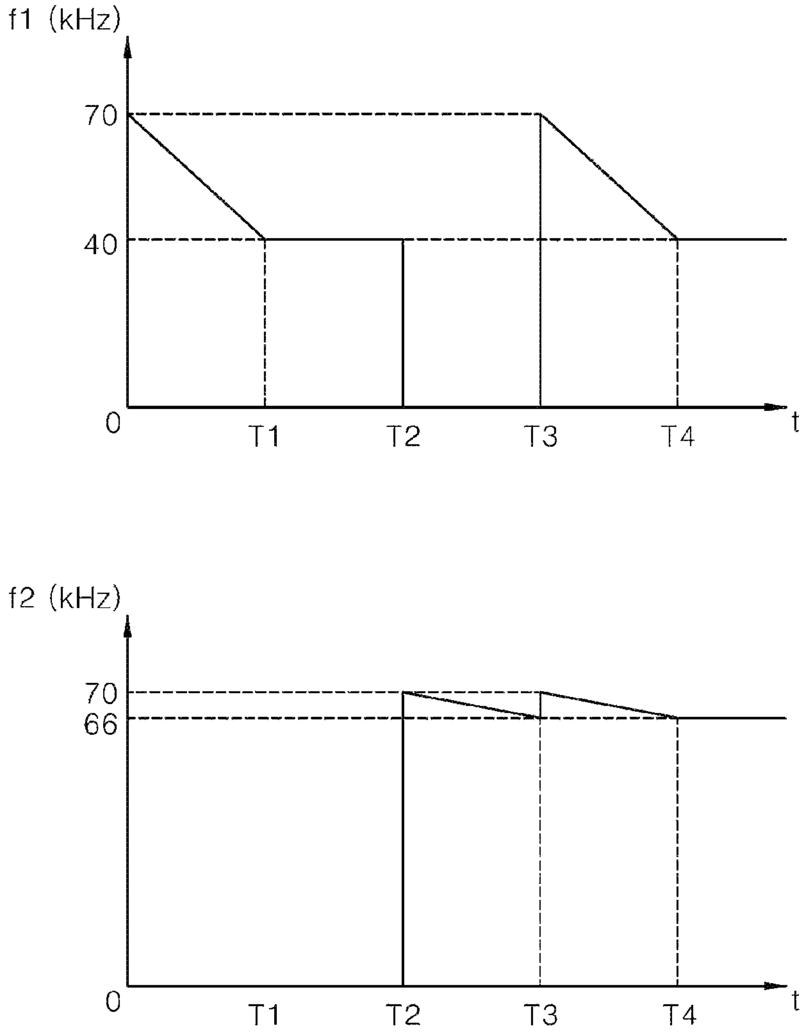
FIG. 7 is a graph for describing a process of controlling driving frequencies of a first working coil and a second working coil when an exemplary induction heating device is driven in a normal mode.

FIG. 5 is a graph for describing a process of controlling driving frequencies of a first working coil and a second working coil when the exemplary induction heating device is driven in a coupling mode. FIG. 6 is a graph for describing a process of controlling driving frequencies of a first working coil and a second working coil when the exemplary induction heating device is driven in a dividing mode. FIG. 7 is a graph for describing a process of controlling driving frequencies of a first working coil and a second working coil when the exemplary induction heating device is driven in a normal mode.

Referring to FIGS. 5 to 7, in a state where the second working coil 104 is not yet driven, the user places a vessel in the first heating area and sets a heating level of the first heating area. Accordingly, an instruction to drive the first working coil 103 may be inputted to the controller 32.

The controller 32, having received the instruction to drive the first working coil 103, may drive the first working coil 103 at a predetermined first adjusted frequency, e.g., 70 kHz. In the disclosure, magnitude of the first adjusted frequency may vary depending on embodiments. As illustrated in FIGS. 4 to 7, the first working coil 103 may start to be driven in the first adjusted frequency of 70 kHz at a time point (0).

The controller 32 may reduce a driving frequency of the first working coil 103 while measuring an output power value of the first working coil 103 such that power the same as a required power value corresponding to the heating level of the first working coil 103, which is set by the user, is supplied to the first working coil 103.

For example, the controller 32 may measure an output power value of the first working coil 103 while gradually reducing a driving frequency of the first working coil 103 from the first adjusted frequency, e.g., 70 kHz, in a section between a time point (0) and a time point (T1) in FIGS. 5 to 7. In this case, the output power value of the first working coil 103 may be calculated based on an input voltage value received from a voltage detector 212 and an input current value received from a current detector 214.

The controller 32 may determine a frequency value (e.g. 40 kHz) at a time point (T1), when the output power value of the first working coil 103, measured while the driving frequency of the first working coil 103 is reduced, matches a required output amount, as the first target frequency of the first working coil 103. Accordingly, the first working coil 103 may be driven at the first target frequency (40 kHz).

Depending on embodiments, the controller 32 may determine a first target frequency corresponding to the instruction to drive the first working coil 103 with reference to a table where target frequencies corresponding to heating levels of the first working coil 103, set by the user, are recorded.

When the first working coil 103 is driven at the first target frequency, the user may place a vessel in the second heating area and may set a heating level of the second heating area. Accordingly, the controller 32 may receive an instruction to drive the second working coil 104. When receiving the instruction to drive the second working coil 104, the controller 32 may stop the driving of the first working coil 103 at a time point (T2) to determine a target frequency (a second target frequency) of the second working coil 104.

The controller 32 may drive the second working coil 104 at the first adjusted frequency, e.g., 70 kHz at the same time as the controller 32 stops the driving of the first working coil 103 at the time point (T2). Depending on embodiments, the second working coil 104 may be driven at the first adjusted frequency after the driving of the first working coil 103 stops and then a predetermined period passes.

According to the present disclosure, the driving of the first working coil 103 may temporarily stop to find a target frequency of the second working coil 104 when driving of the second working coil 104 is requested in the state where the first working coil 103 is being driven, as described above. Accordingly, the driving frequency of the first working coil 103 may be 0 in a section (T2~T3) where a target frequency of the second working coil 104 is searched. On the basis of the control, interference noise caused by the first working coil 103 and the second working coil 104 may not occur in the section (T2~T3) where the target frequency of the second working coil 104 is searched.

The controller 32 may calculate an output power value of the second working coil 104 while gradually reducing a driving frequency of the second working coil 104 in the above-described process of searching the target frequency of the first working coil 103. When the output power value of the second working coil 104 matches a required power value of the second working coil 104 at a time point (T3), the controller 32 may determine a frequency value (43 kHz) at the time point (T3) as a second target frequency of the second working coil 104.

Depending on embodiments, the controller 32 may determine a second target frequency corresponding to the instruction to drive the second working coil 104 with reference to a table where target frequencies corresponding to heating levels of the second working coil 104, set by the user, are recorded.

The controller 32 may compare the target frequencies of the first working coil 103 and the second working coil 104 without driving the working coils at their own target frequency at the time point (T3) when the second target frequency of the second working coil 104 is determined. As a result of comparison, the controller 32 may determine a driving mode of the induction heating device among the coupling mode, the dividing mode and the normal mode.

Specifically, the controller 32 may calculate an absolute value (M) of a difference between the first target frequency of the first working coil 103 and the second target frequency of the second working coil 104. The controller 32 may determine a driving mode by comparing the absolute value (M) of the difference between the first target frequency of the first working coil 103 and the second target frequency of the second working coil 104 with a predetermined reference value.

In the case where the absolute value (M) of the difference of the first target frequency of the first working coil 103 and the second target frequency of the second working coil 104 is equal to or greater than a predetermined first reference value and is less than a predetermined second reference value, the controller 32 may determine the driving mode of the induction heating device as a coupling mode. In the coupling mode, the controller 32 may set a final driving frequency of the first working coil 103 and a final driving frequency of the second working coil 104 to the same value.

For example, in the case where the controller 32 determines a first target frequency of the first working coil 103 as 40 kHz at the time point (T1), and a second target frequency of the second working coil 104 as 43 kHz at the time point (T3), as in the embodiment of FIG. 5, the controller 32 may calculate a difference between the two target frequencies (43−40=3 kHz). On the assumption that a first reference value is 2 kHz and a second reference value is 8 kHz, an absolute value (M) of the calculated difference is equal to or greater than the first reference value and less than the second reference value. Accordingly, the controller 32 may determine the driving mode of the induction heating device as a coupling mode.

When determining the driving mode of the induction heating device as a coupling mode, the controller 32, as illustrated in FIG. 5, may set a final driving frequency of the first working coil 103 and a final driving frequency of the second working coil 104 to the greater (43 kHz) of the two target frequencies—the first target frequency (40 kHz) of the first working coil 103 and the second target frequency (43 kHz) of the second working coil 104.

In another embodiment, the controller 32 may set the final driving frequency of the first working coil 103 and the final driving frequency of the second working coil 104 to the less (40 kHz) of the two target frequencies—the first target frequency (40 kHz) of the first working coil 103 and the second target frequency (43 kHz) of the second working coil 104.

According to the present disclosure, when a difference between the first target frequency of the first working coil 103 and the second target frequency of the second working coil 104 is equal to or greater than the first reference value and less than the second reference value, the final driving frequencies of the two working coils may be matched such that interference noise, caused by a difference between the driving frequencies of the two working coils, is removed, as described above.

In another embodiment of the disclosure, when the driving mode of the induction heating device is a coupling mode, the controller 32 may set the final driving frequencies of the two working coils to a value (e.g. an average of the target frequencies of the two working coils or any set value) different from the target frequencies of the two working coils.

When the absolute value (M) of the difference between the first target frequency of the first working coil 103 and the second target frequency of the second working coil 104 is equal to or greater than the second reference value and less than or equal to a predetermined third reference value, the controller 32 may determine the driving mode of the induction heating device as a dividing mode. In the dividing mode, the controller 32 may set a final driving frequency of the first working coil 103 and a final driving frequency of the second working coil 104 such that a difference between the final driving frequency of the first working coil 103 and the final driving frequency of the second working coil 104 is set equal to or greater than a predetermined noise avoidance value (k).

For example, in the case where the controller 32 determines a first target frequency of the first working coil 103 as 40 kHz at the time point (T1), and a second target frequency of the second working coil 104 as 50 kHz at the time point (T3), as in the embodiment of FIG. 6, the controller 32 may calculate an absolute value of a difference between the two target frequencies (50−40=10 kHz). On the assumption that a second reference value is 8 kHz and a third reference value is 20 kHz, the absolute value (M) of the difference is equal to or greater than the second reference value and less than or equal to the third reference value. Accordingly, the controller 32 may determine the driving mode of the induction heating device as a dividing mode.

When determining the driving mode of the induction heating device as a dividing mode, the controller 32 may set a final driving frequency of the first working coil 103 to 40 kHz the same as the first target frequency. Additionally, the controller 32 may set a final driving frequency of the second working coil 104 to 62 kHz increased by a predetermined noise avoidance value (k) of 22 kHz from 40 kHz that is the final driving frequency of the first working coil 103. Magnitude of the noise avoidance value (k) may be set to different values (e.g. 25 kHz) depending on embodiments.

In another embodiment of the disclosure, the controller 32 may set the final driving frequency of the first working coil 103 to a value (e.g. 36 kHz) less than the first target frequency (40 kHz), and may set the final driving frequency of the second working coil 104 to a value (e.g. 58 kHz) increased by the noise avoidance value (k) from the final driving frequency of the first working coil 103.

According to the present disclosure, when an absolute value (M) of a difference between the first target frequency of the first working coil 103 and the second target frequency of the second working coil 104 is equal to or greater than the second reference value and less than the third reference value, the final driving frequency of each working coil may be set such that a difference between the final driving frequencies of the working coils is set equal to or greater than a predetermined noise avoidance value (k). On the basis of the control, the difference (22 kHz) between the driving frequencies of the two working coils is out of a range of audio frequencies (e.g. 2 kHz to 20 kHz). Accordingly, interference noise, caused by operation of the working coils may be removed.

When an absolute value (M) of a difference between the first target frequency of the first working coil 103 and the second target frequency of the second working coil 104 is less than the first reference value or greater than the third reference value, the controller 32 may determine the driving mode of the induction heating device as a normal mode. When the calculated absolute value (M) of the difference is less than the first reference value or greater than the third reference value, the absolute value (M) of the difference between the first target frequency of the first working coil 103 and the second target frequency of the second working coil 104 may be out of the range of audio frequencies (e.g. 2 kHz to 20 kHZ). Accordingly, when determining the driving mode of the induction heating device as a normal mode, the controller 32 may determine the first target frequency of the first working coil 103 as a final driving frequency of the first working coil 103, and may determine the second target frequency of the second working coil 104 as a final driving frequency of the second working coil 104.

For example, in the case where the controller 32 determines a first target frequency of the first working coil 103 as 40 kHz and a second target frequency of the second working coil 104 as 66 kHz at the time point (T3), as in the embodiment of FIG. 7, the controller 32 may calculate an absolute value of a difference between the two target frequencies (66−40=26 kHz). Since the calculate absolute value (26 kHz) of the difference is greater than the third reference value (20 kHz), the controller 32 may set a final driving frequency of the first working coil 103 to 40 kHz, and may set a final driving frequency of the second working coil 104 to 66 kHz.

When determining an output control method of each working coil, as described above, the controller 32 may simultaneously drive the first working coil 103 and the second working coil 104 at a second adjusted frequency.

For example, as illustrated in FIGS. 5 to 7, the first working coil 103 and the second working coil 104 may be simultaneously driven at the second adjusted frequency, e.g., 70 kHz, at the time point (T3). According to the disclosure, the final driving frequencies of the first working coil 103 and the second working coil 104 may be determined after the second target frequency of the second working coil 104 is determined, and the first working coil 103 and the second working coil 104 may be simultaneously driven at the same frequency, i.e., the second adjusted frequency.

In the case where a driving frequency of the first working coil 103 increases to the final driving frequency while maintaining the final driving frequency of the second working coil 104 at the time point (T3) after the determination of the final driving frequencies of the first working coil 103 and the second working coil 104, a difference between driving frequencies of the first working coil 103 and the second working coil 104 may be included in the range of audio frequencies and may cause interference noise. To prevent this from happening, the first working coil 103 and the second working coil 104 may be respectively driven simultaneously at the same frequency—i.e. at the second adjusted frequency—at the time point (T3) after the determination of the final driving frequency of each working coil, in the disclosure.

In the present disclosure, simultaneous operation of the first working coil 103 and the second working coil 104 at the second adjusted frequency after the determination of the final driving frequencies is referred to as a "soft start" operation. The second adjusted frequency may be set to a frequency the same as or different from the first adjusted frequency.

After the soft start operation, the controller 32 may adjust, i.e., reduce, the driving frequencies of the first working coil 103 and the second working coil 104 respectively to the previously determined final driving frequencies. After the driving frequencies are adjusted, the first working coil 103 and the second working coil 104 may heat a vessel without causing interference noise while respectively being driven at its final driving frequency.

On the basis of the control of the driving frequencies, interference noise, which is generated when the first working coil 103 and the second working coil 104 are driven at the same time, may be removed.

When the driving mode of the induction heating device is a coupling mode as in the embodiment of FIG. 5, the final driving frequencies of the first working coil 103 and the second working coil 104 may be the same as the target frequencies or there is little difference between the final driving frequencies and the target frequencies. Additionally, when the driving mode of the induction heating device is a normal mode as in the embodiment of FIG. 7, the final driving frequencies of the first working coil 103 and the second working coil 104 may be the same as the target frequencies. Accordingly, when the driving mode of the induction heating device is a coupling mode or a normal mode, an output power value of the first working coil 103 and the second working coil 104 may satisfy a required power value set by the user respectively.

However, when the driving mode of the induction heating device is a dividing mode as in the embodiment of FIG. 6, the final driving frequency of the second working coil 104 may be 62 kHz or 58 kHz which is greater than 50 kHz that is the second target frequency of the second working coil 104. When the final driving frequency of the second working coil 104 increases to 62 kHz or 58 kHz, as described above with reference to FIG. 6, an output power value of the second working coil 104 may be less than when the driving frequency is 50 kHz. That is, an output power value when the second working coil 104 is driven at the final driving frequency may be less than a required power value set by the user. Thus, the second working coil 104 may not supply thermal energy, corresponding to a heating level set by the user, to a vessel.

To prevent the output power value of the second working coil 104 from being less, the controller 32 may reset an output power value of the first working coil 103 based on a temperature value measured at the first working coil 103, and then may reset final driving frequencies of the first working coil 103 and the second working coil 104.

Figure 8:
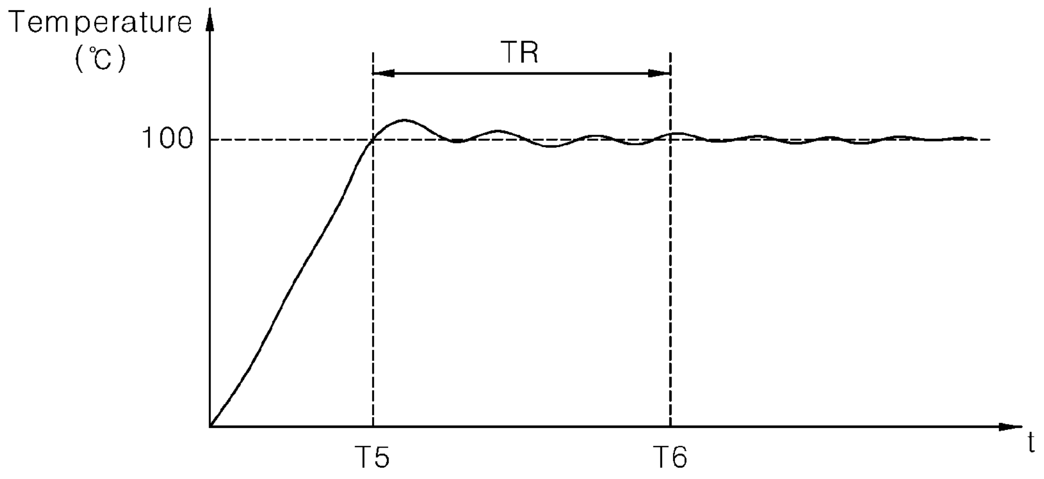
FIG. 8 is a graph showing a change in temperature values measured in a high-power working coil when an exemplary induction heating device is driven in a dividing mode.

FIG. 8 is a graph showing a change in temperature values measured in a high-power working coil when an exemplary induction heating device is driven in a dividing mode.

When the driving mode of the induction heating device is a dividing mode, and a first final driving frequency of the first working coil 103 and a second final driving frequency of the second working coil 104 are determined in the embodiment of FIG. 6, the controller 32 may drive the first working coil 103 at the first final driving frequency and may drive the second working coil 104 at the second final driving frequency (see the time point (T4) in FIG. 6).

After the time point (T4), the controller 32 may acquire a temperature value of a high output power value of a working coil, i.e., a high-power working coil, of the first working coil 103 and the second working coil 104. For example, in the embodiment of FIG. 6, the first final driving frequency of the first working coil 103 may be less than the second final driving frequency of the second working coil 104, and an output power value of the first working coil 103 may be greater than an output power value of the second working coil 104. Accordingly, in the embodiment of FIG.6, the first working coil 103 is referred to as a high-power working coil, and the second working coil 104 is referred to as a low-power working coil. The controller 32 may acquire the high-power working coil's temperature value, i.e., the first working coil 103's temperature value that are measured through a temperature sensor after the time point (T4).

The controller 32 may determine whether the temperature value of the high-power working coil, i.e., the first working coil 103, satisfies a predetermined output change condition.

In one embodiment, in the predetermined output change condition, the acquired temperature value of the high-power working coil may be set equal to or greater than a predetermined reference temperature value. For example, when the reference temperature value is set to 100° C. in the embodiment of FIG. 8, the controller 32 may compare a temperature value of the first working coil 103 with the reference temperature value of 100° C. In the case where the temperature value of the first working coil 103 is 100° C. or greater at the time point (T5), the controller 32 may confirm that the output change condition is satisfied.

In another embodiment, the output change condition is set such that the acquired temperature value of the high-power working coil is maintained within a range of predetermined reference temperatures for a predetermined reference period. For example, when the reference period is set to TR and the range of reference temperatures is set to 100° C.±5° C., i.e., 95° C. to 105° C. in the embodiment of FIG. 8, the controller 32 may confirm whether the temperature value of the first working coil 103 is maintained within the range of 95° C. to 105° C. for the reference period of TR. The controller 32 may confirm that the output change condition is satisfied at a time point (T6) when the controller 32 confirms that the temperature value of the first working coil 103 is maintained within the range of 95° C. to 105° C. for the reference period of TR.

The above-described reference temperature value, reference period and range of reference temperatures may vary depending on embodiments. Additionally, the reference temperature value may be set equal to or greater than a boiling point of a load (e.g. water or cooking oil) contained in a vessel heated by the high-power working coil. Further, the range of reference temperatures may be set to a value that is high or low with respect to the reference temperature value, i.e., a value that is greater or less than the reference temperature value by a predetermined offset value (e.g. 5° C.).

When confirming that a temperature value of the high-power working coil satisfies the output change condition, the controller 32 may set a required power value of the high-power working coil to a predetermined minimum power value.

When a temperature value of the high-power working coil satisfies the output change condition, a load (e.g. water) in a vessel heated by the first working coil 103 is boiling. As long as a minimum amount of thermal energy is supplied to keep the load boiling, the load in the vessel in the first heating area may keep boiling. According to the disclosure, after the controller 32 confirms that the temperature value of the high-power working coil satisfies the output change condition, the required power value of the high-power working coil is reset to a predetermined minimum power value such that high-power working coil supplies a minimum amount of power for enabling the load in the vessel heated by the high-power working coil to keep boiling. The minimum power value may vary depending on embodiments.

For example, when a temperature value of the first working coil 103 satisfies the output change condition at the time point (T5) or the time point (T6) in the embodiment of FIG. 8, the controller 32 may set a required output value of the first working coil 103 to a minimum power value, e.g. 1500 W, rather than a required output value set by the user.

When the required output value of the first working coil 103 is reset to the minimum power value as described above, the controller 32 may reset a driving mode of the induction heating device as describe below.

Figure 9:
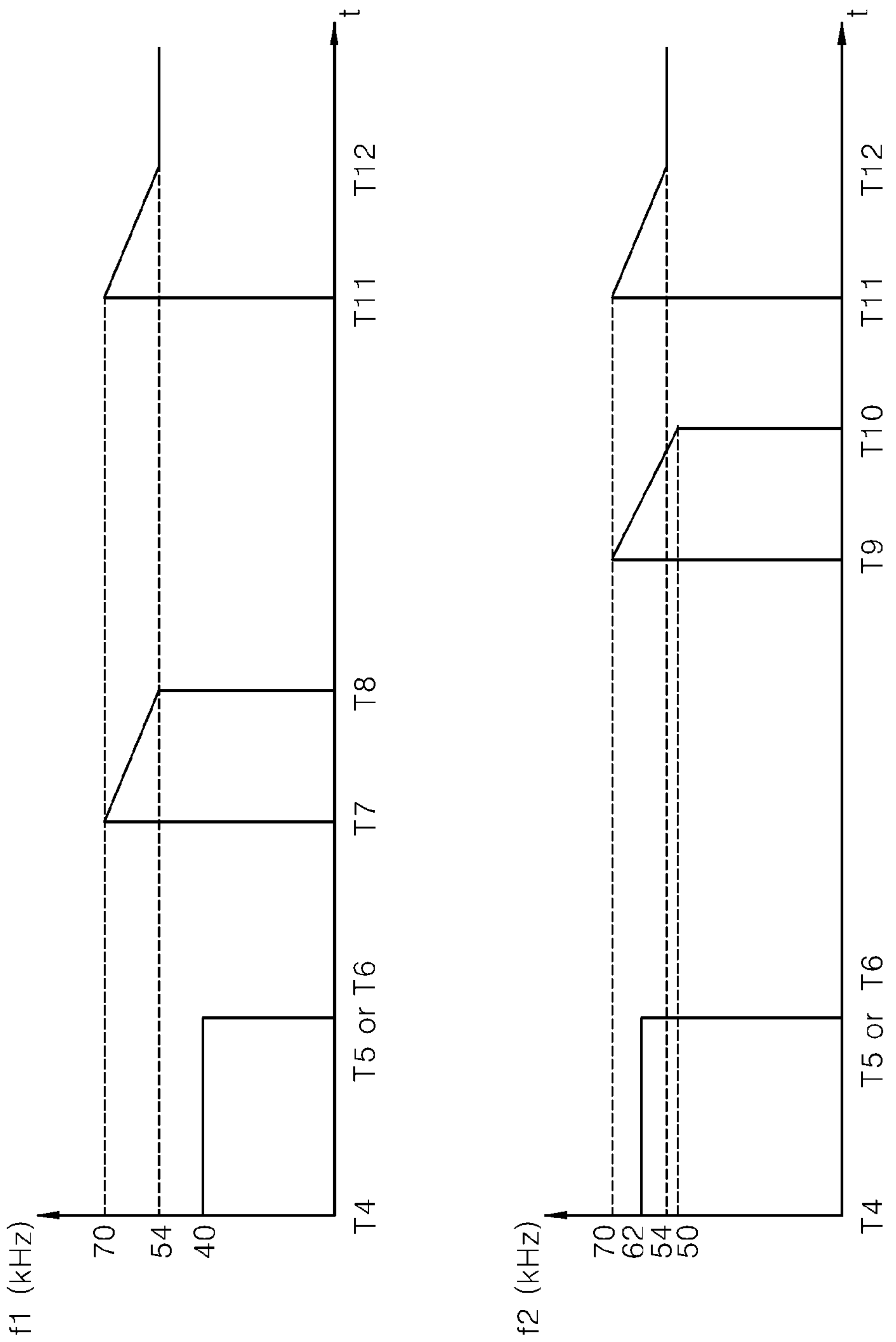
FIG. 9 is a graph for describing a process of re-determining a driving mode of an exemplary induction heating device after the induction heating device is driven in a dividing mode.

FIG. 9 is a graph for describing a process of re-determining a driving mode of an exemplary induction heating device after the induction heating device is driven in a dividing mode.

Referring to FIG. 9, the first working coil 103 and the second working coil 104 may be respectively driven at final driving frequencies of 40 kHz and 62 kHz at the time point (T4) after the controller 32 determines the driving mode of the induction heating device as a dividing mode, as described with reference to the embodiment of FIG. 6. Accordingly, interference noise, caused by operation of the first working coil 103 and the second working coil 104, may be removed, but an output power value of the second working coil 104 is less than a required power value.

After the first working coil 103 is driven at a first final driving frequency and the second working coil 104 is driven at a second final driving frequency, the controller 32 may calculate an absolute value (N) of a difference between the first final driving frequency and the second final driving frequency. The controller 32 may determine whether the calculated absolute value (N) of the difference between the first final driving frequency and the second final driving frequency is equal to or greater than a predetermined noise avoidance value (k).

When the absolute value (N) of the difference of the first final driving frequency and the second final driving frequency is less than the noise avoidance value (k), it may denote that the driving mode of the induction heating device is a coupling mode, or that an absolute value (M) of a difference between a first target frequency and a second target frequency is less than a first reference value while the driving mode of the induction heating device is a normal mode. In this case, the above-mentioned reduction in the output power value of the working coil may not occur. Accordingly, when the absolute value (N) of the difference between the first final driving frequency and the second final driving frequency is less than the noise avoidance value (k), the controller (32) may maintain a driving frequency of the first working coil 103 at the first final driving frequency and may maintain a driving frequency of the second working coil 104 at the second final driving frequency.

When the absolute value (N) of the difference between the first final driving frequency and the second final driving frequency is equal to or greater than the noise avoidance value (k), it may denote that the driving mode of the induction heating device is a dividing mode, or that the absolute value (M) of the difference between the first target frequency and the second target frequency is greater than a third reference value while the driving mode of the induction heating device is a normal mode. When the driving mode of the induction heating device is a dividing mode, the above-mentioned reduction in the output power value of the working coil may occur. Accordingly, when the absolute value (N) of the difference between the first final driving frequency and the second final driving frequency is equal to or greater than the noise avoidance value (k), the controller 32 may compare a final driving frequency of a less-output working coil with a target frequency of the low-power working coil.

When the final driving frequency of the low-power working coil is the same as the target frequency of the low-power working coil, it may denote that the driving mode of the induction heating device is a normal mode. Accordingly, when the final driving frequency of the low-power working coil is the same as the target frequency of the low-power working coil, the controller 32 may maintain the driving frequency of the first working coil 103 at the first final driving frequency and may maintain the driving frequency of the second working coil 104 at the second final driving frequency.

When the final driving frequency of the low-power working coil is different from the target frequency of the low-power working coil, it may denote that the driving mode of the induction heating device is a dividing mode. For example, in the embodiment of FIG. 9, the controller 32 may confirm that the final driving frequency (62 kHz) of the second working coil 104, which is a low-power working coil, is different from a target frequency (50 kHz) of the second working coil 104. In this case, the driving mode of the induction heating device is a dividing mode, and the low-power working coil—i.e. the second working coil 104—is being driven at the final driving frequency (62 kHz) greater than the target frequency (50 kHz). Accordingly, an output power value of the second working coil 104 may be less than a required power value.

When confirming that the final driving frequency of the low-power working coil is different from the target frequency of the low-power working coil, the controller 32 may acquire a temperature value of a high-power working coil and may determine whether the acquired temperature value of the high-power working coil satisfies a predetermined output change condition.

After the first working coil 103 and the second working coil 104 are respectively driven at the final driving frequencies of 40 kHz and 62 kHz, the temperature value of the high-power working coil, i.e., the first working coil 103 satisfies the output change condition at the time point (T5) or at the time point (T6) as described with reference to the embodiment of FIG. 8. Accordingly, the controller 32 may reset a required power value of the high-power working coil, i.e., the first working coil 103, to a minimum power value (e.g. 1500 W).

Then the controller 32 may stop all the first working coil 103 and the second working coil 104 from operating to -determine a driving mode of the induction heating device again. At a time point (T7), the controller 32 may drive the first working coil 103 at a predetermined first adjusted frequency, e.g., 70 kHz, and then may reduce the driving frequency of the first working coil 103 until the output power value of the first working coil 103 matches the required power value.

In the embodiment of FIG. 8, a first target frequency of the first working coil 103 may be 54 kHz that is a frequency when the output power value of the first working coil 103 matches the preset required power value of 1500 W, at a time point (T8). Compared to the embodiment of FIG. 6, as the required power value of the first working coil 103 is reduced, the first target frequency of the first working coil 103 may increase from 40 kHz to 54 kHz.

Then the first working coil 103 may temporarily stop operating, and, at a time point (T9), the second working coil 104 may be driven at the first adjusted frequency, e.g., 70 kHz. In this case, a required power value of the second working coil 104 may be the same as the required power value in the embodiment of FIG. 6. Accordingly, at a time point (T10), a second target frequency of the second working coil 104 may be reset to 50 kHz.

In the embodiment of FIG. 8, the first target frequency of the first working coil 103 is searched first by the controller 32 at the time point (T7) to the time point (T8). However, the second target frequency of the second working coil 104 may be searched first, depending on embodiments.

Then the controller 32 may calculate an absolute value (M) of a difference between the first target frequency of the first working coil 103 and the second target frequency of the second working coil 104. In the embodiment of FIG. 9, the absolute value (M) of the difference between the first target frequency of the first working coil 103 and the second target frequency of the second working coil 104 may be 4 kHz.

On the assumption that a first reference value, a second reference value, and a third reference value are the same as those in the above-described embodiment of FIGS. 5 to 7, 4 kHz is equal to or greater than the first reference value (2 kHz) and less than the second reference value (8 kHz). Accordingly, the controller 32 may determine the driving mode of the induction heating device as a coupling mode, and may set a first final driving frequency of the first working coil 103 and a second final driving frequency of the second working coil 104 to the same value (e.g. 54 kHz).

When determining the final driving frequencies, the controller 32 may simultaneously drive the first working coil 103 and the second working coil 104 at a second adjusted frequency, e.g., 70 kHz, at a time point (T11). Then driving frequencies of the first working coil 103 and the second working coil 104 may be reduced to a final driving frequency of 54 kHz at a time point (T12).

Accordingly, interference noise, caused by operation of the first working coil 103 and the second working coil 104, may not occur after the time point (T12). Additionally, after the time point (T12), a minimum amount of thermal energy may be supplied to a vessel in the first heating area corresponding to the first working coil 103 such that a load in the vessel may keep boiling. Further, after the time point (T12), the driving frequency of the second working coil 104 is maintained at 54 kHz corresponding to a required power value set by the user. Accordingly, less output power of the second working coil 104, which is caused temporarily between the time point (T4) and the time point (T5) (or the time point (T6)), may be dealt with.

Unlike the embodiment of FIG. 9, the controller 32 may determine the driving mode of the induction heating device as a dividing mode or a normal mode between the time point (T10) and the time point (T11), depending on an absolute value (M) of a difference between the first target frequency of the first working coil 103 and the second target frequency of the second working coil 104, which are determined at the time point (T8) and the time point (T10).

When the controller 32 determines the driving mode of the induction heating device as a dividing mode between the time point (T10) and the time point (T11), the processes from the time point (T4) to the time point (T10) may be repeated. However, when the controller 32 determines the driving mode of the induction heating device as a normal mode between the time point (T10) and the time point (T11), the first working coil 103 and the second working coil 104 may be driven respectively at the final driving frequency determined between the time point (T10) and the time point (T11), and the processes from the time point (T4) to the time point (T10) may not be repeated.

On the basis of the control method, even when the first working coil 103 and the second working coil 104 are driven at the same time, interference noise may not occur. Further, when the controller 32 determines the driving mode of the induction heating device as a dividing mode, an output power value of the low-power working coil may be temporarily less. However, the output power value of the low-power working coil increases again after a time point when a load in a vessel heated by the high-power working coil reaches a reference temperature, or reaches a range of reference temperatures for a reference period. Finally, according to the present disclosure, interference noise may be prevented and thermal energy satisfying the user's needs may be supplied to the vessel.

Figure 10:
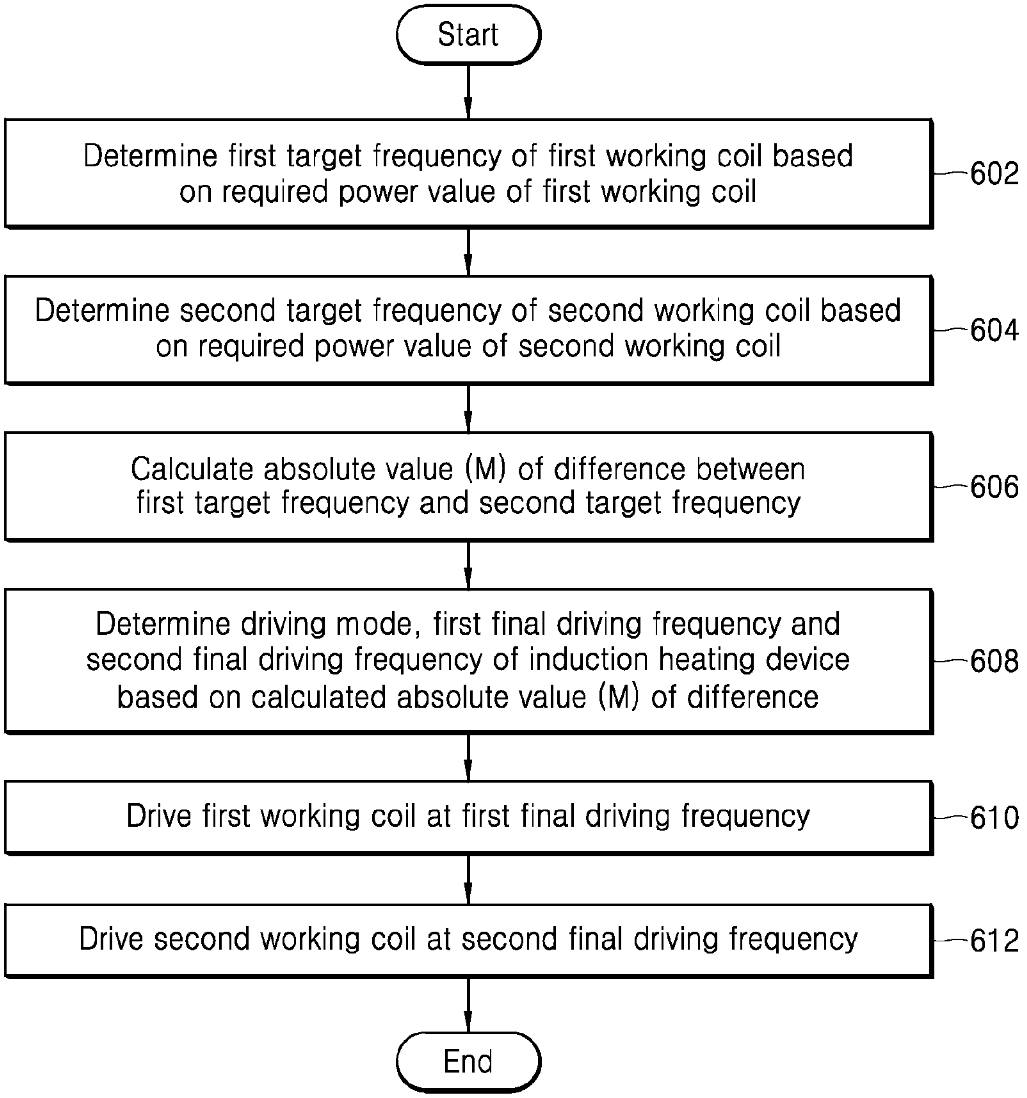
FIG. 10 is a flow chart showing a process of driving a first working coil and a second working coil respectively at a final driving frequency in one embodiment.

FIG. 10 is a flow chart showing a process of driving a first working coil and a second working coil respectively at a final driving frequency in one embodiment. The flow chart may be performed by the controller 32 according to instructions stored in the memory.

Referring to FIG. 10, the controller 32 of the exemplary induction heating device may determine a first target frequency of the first working coil 103 on the basis of a required power value of the first working coil (602). Additionally, the controller 32 may determine a second target frequency of the second working coil 104 on the basis of a required power value of the second working coil 104 (604).

Then the controller 32 may calculate an absolute value (M) of a difference between the first target frequency and the second target frequency that are determined in previous steps (606).

The controller 32 may determine a driving mode of the induction heating device, a first final driving frequency of the first working coil 103 and a second final driving frequency of the second working coil 104 on the basis of the absolute value (M) of the difference between the first target frequency and the second target frequency that are calculated in step 606 (608).

When determining the driving mode of the induction heating device, the first final driving frequency of the first working coil 103 and the second final driving frequency of the second working coil 104, the controller 32 may drive the first working coil 103 at the first final driving frequency (610), and may drive the second working coil 104 at the second final driving frequency (612).

Figure 11:
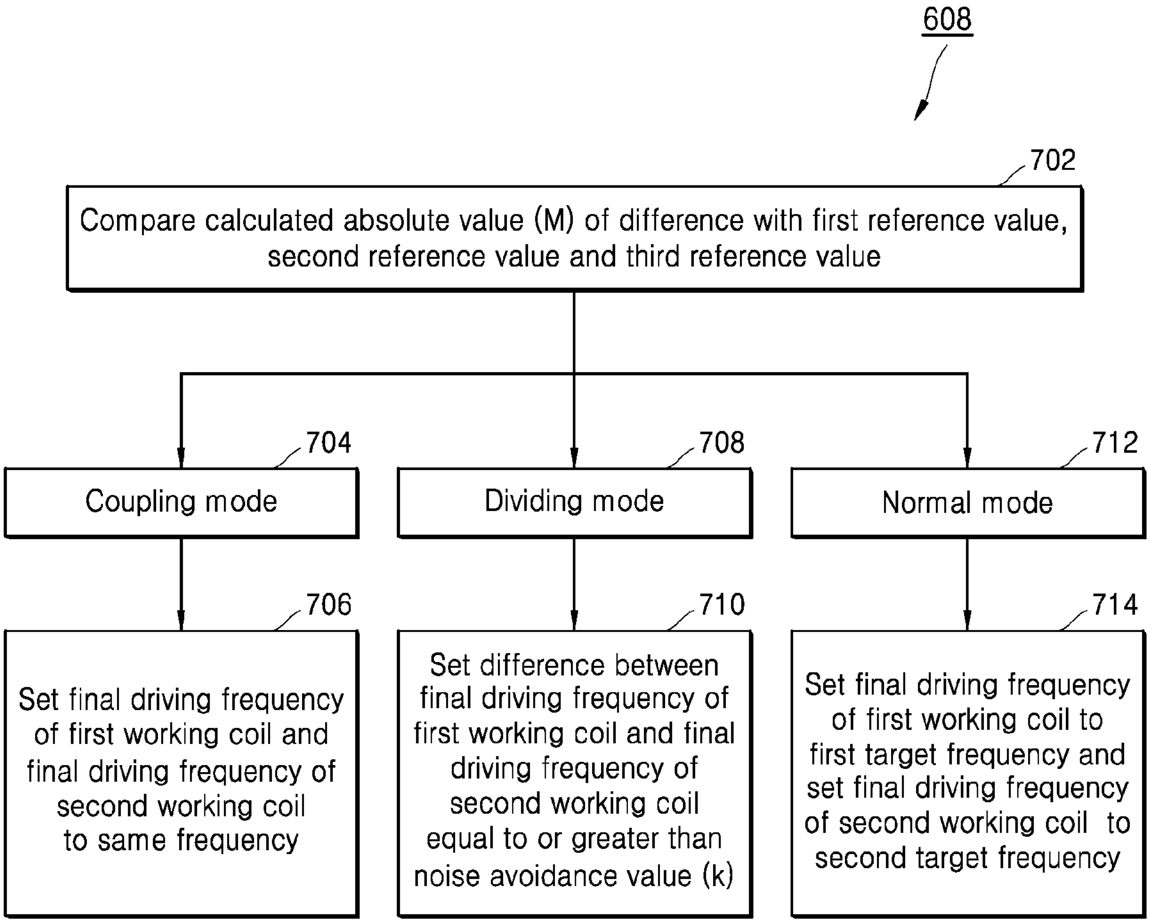
FIG. 11 is a flow chart showing a process of determining a final driving frequency of a first working coil and a second working coil in one embodiment.

FIG. 11 is a flow chart showing a process of determining a final driving frequency of a first working coil and a second working coil in one embodiment. The flow chart may be performed by the controller 32 according to instructions stored in the memory.

Referring to FIG. 11, the controller 32 may compare the absolute value (M) of the difference between the first target frequency and the second target frequency, which is calculated in step 606, with a predetermined first reference value, a predetermined second reference value and a predetermined third reference value (702).

In the case where the absolute value (M) of the difference between the first target frequency and the second target frequency is equal to or greater than the first reference value and less than the second reference value, the controller 32 may determine the driving mode as a coupling mode (704), and may set a final driving frequency of the first working coil 103 and a final driving frequency of the second working coil 104 to the same value (706).

In case the absolute value (M) of the difference between the first target frequency and the second target frequency is equal to or greater than the second reference value and less than or equal to the third reference value, the controller 32 may determine the driving mode as a dividing mode (708), and may set a final driving frequency of each working coil such that a difference between the final driving frequency of the first working coil 103 and the final driving frequency of the second working coil 104 is equal to or greater than a predetermined noise avoidance value (k) (710).

In case the absolute value (M) of the difference between the first target frequency and the second target frequency is less than the first reference value or greater than the third reference value, the controller 32 may determine the driving mode as a normal mode (712), and may respectively set a first final driving frequency of the first working coil 103 as a first target frequency and a second final driving frequency of the second working coil 104 as a second target frequency (714).

Figure 12:
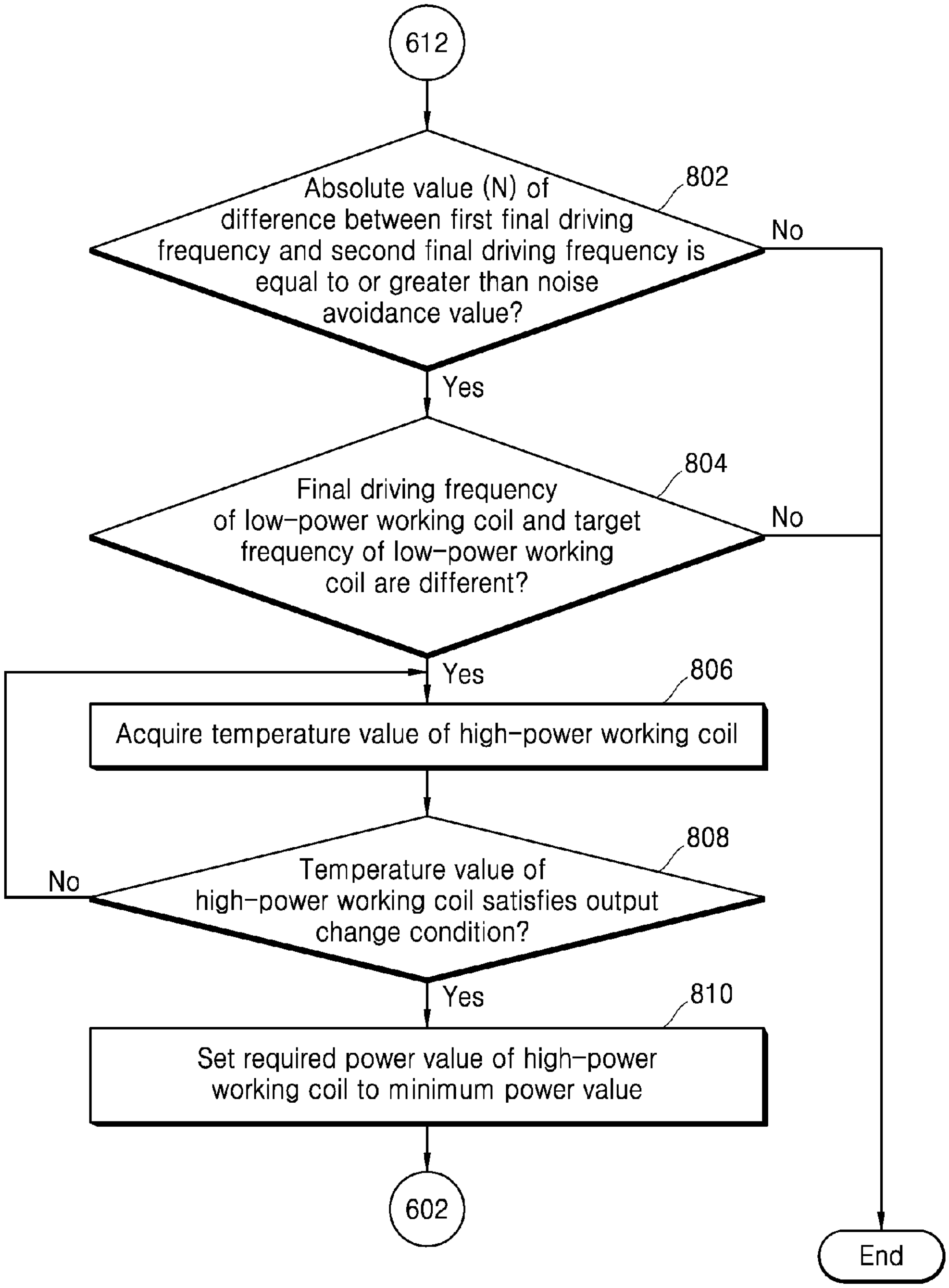
FIG. 12 is a flow chart showing a process of controlling an induction heating device to solve a problem associated with a reduction in an output power value of working coils when a first working coil and a second working coil are respectively driven at a final driving frequency, in one embodiment.

FIG. 12 is a flow chart showing a process of controlling an induction heating device to solve a problem associated with a reduction in an output power value of working coils when a first working coil and a second working coil are respectively driven at a final driving frequency, in one embodiment. The flow chart may be performed by the controller 32 according to instructions stored in the memory.

After the first working coil 103 is driven at the first final driving frequency in step 610 and the second working coil 104 is driven at the second final driving frequency in step 612, the controller 32 may calculate an absolute value (N) of a difference between the first final driving frequency and the second final driving frequency. The controller 32 may confirm whether the calculated absolute value (N) of the difference between the first final driving frequency and the second final driving frequency is equal to or greater than a predetermined noise avoidance value (k) (802).

In the case where the absolute value (N) of the difference between the first final driving frequency and the second final driving frequency is less than the noise avoidance value (k), it may denote that the driving mode of the induction heating device is a coupling mode, or may denote that the driving mode of the induction heating device is a normal mode and that the absolute value (M) of the difference between the first target frequency and the second target frequency is less than the first reference value. In this case, the above-described reduction in the output power value of the working coil does not occur. Accordingly, in case the absolute value (N) of the difference between the first final driving frequency and the second final driving frequency is less than the noise avoidance value (k) in step 802, the controller 32 may maintain a driving frequency of the first working coil 103 at the first final driving frequency and may maintain a driving frequency of the second working coil 104 at the second final driving frequency.

In the case where the absolute value (N) of the difference between the first final driving frequency and the second final driving frequency is equal to or greater than the noise avoidance value (k), it may denote that the driving mode of the induction heating device is a dividing mode, or may denote that the driving mode of the induction heating device is a normal mode and that the absolute value (M) of the difference between the first target frequency and the second target frequency is greater than the third reference value. When the driving mode of the induction heating device is a dividing mode, the above-described reduction the output power value of the working coil may occur. Accordingly, in case the absolute value (N) of the difference between the first final driving frequency and the second final driving frequency is equal to or greater than the noise avoidance value (k) in step 802, the controller 32 may compare a final driving frequency of the low-power working coil with a target frequency of the low-power working coil (804).

When the final driving frequency of the low-power working coil is the same as the target frequency of the low-power working coil, it may denote that the driving mode of the induction heating device is a normal mode. Accordingly, in case the final driving frequency of the low-power working coil is the same as the target frequency of the low-power working coil in step 804, the controller 32 may maintain a driving frequency of the first working coil 103 at the first final driving frequency and may maintain a driving frequency of the second working coil 104 at the second final driving frequency.

In the case where the final driving frequency of the low-power working coil is different from the target frequency of the low-power working coil, it may denote that the driving mode of the induction heating device is a dividing mode. In the embodiment of FIG. 9, the controller 32 may confirm that the final driving frequency (62 kHz) of the second working coil 104, which is the low-power working coil, is different from the target frequency (50 kHz) of the second working coil 104. In this case, the driving mode of the induction heating device is a dividing mode, and the low-power working coil, i.e., the second working coil 104, is being driven at the final driving frequency (62 kHz) greater than the target frequency (50 kHz). Accordingly, the output power value of the second working coil 104 may be less than a required power value.

When confirming that the final driving frequency of the low-power working coil is different from the target frequency of the low-power working coil in step 804, the controller 32 may acquire a temperature value of the high-power working coil (806), and may determine whether the acquired temperature value of the high-power working coil satisfies a predetermined output change condition (808).

In the output change condition according to one embodiment, the temperature value of the high-power working coil is equal to or greater than a predetermined reference temperature value. In the output change condition according to another embodiment, the temperature value of the high-power working coil is maintained within a range of predetermined reference temperatures for a predetermined reference period.

In case the temperature value of the high-power working coil does not satisfy the output change condition in step 806, the controller 32 may perform step 806 and step 808 again while maintaining current driving states of the first working coil 103 and the second working coil 104.

In case the temperature value of the high-power working coil satisfies the output change condition in step 808, the controller 32 may set a required power value of the high-power working coil to a predetermined minimum power value (810). In the embodiment of FIG. 9, the required power value of the first working coil 103, which is the high-power working coil, may be set to the minimum power value.

When the required power value of the high-power working coil is set to the minimum power value, the controller 32 may perform steps 602 to 608 illustrated in FIG. 10 to re-determine a driving mode of the induction heating device, a first final driving frequency and a second final driving frequency, and may drive the first working coil 103 and the second working coil 104 respectively at the determined final driving frequencies (610, 612).

Although the embodiments have been described with reference to a number of illustrative embodiments thereof, it should be understood that the embodiments and drawings in the present disclosure are not limited and that numerous other modifications and embodiments can be devised by those skilled in the art and are encompassed by the claims. Additionally, though not explicitly described during description of the embodiments, predictable effects based on the configurations of the embodiments should be acknowledged.

What is claimed is:

1. A controlling method by an induction heating device, comprising:

determining a first target frequency of a first working coil corresponding to a first heating area and a second target frequency of a second working coil corresponding to a second heating area;

determining a first final driving frequency of the first working coil and a second final driving frequency of the second working coil based on the first target frequency and the second target frequency;

determining a high-power working coil and a low-power working coil among the first working coil and the second working coil based on the first final driving frequency and the second final driving frequency;

acquiring a temperature value of the high-power working coil, when an absolute value of a difference between the first final driving frequency of the first working coil and the second final driving frequency of the second working coil is equal to or greater than a predetermined noise avoidance value, and when a final driving frequency of the low-power working coil differs from a target frequency of the low-power working coil;

determining whether the temperature value of the high-power working coil satisfies a predetermined output change condition;

setting a required power value of the high-power working coil to a predetermined minimum power value when the temperature value satisfies the predetermined output change condition; and determining the first final driving frequency of the first working coil and the second final driving frequency of the second working coil again, wherein the predetermined minimum power value is lower than a power value corresponding to a target frequency of the high-power working coil.

2. The method of claim 1, wherein the predetermined output change condition is satisfied when the temperature value is equal to or greater than a predetermined reference temperature value.

3. The method of claim 1, wherein the predetermined output change condition is satisfied when the temperature value acquired for a predetermined reference period is maintained within a range of predetermined reference temperatures for the predetermined reference period.

4. The method of claim 1, further comprising:

determining the first target frequency of the first working coil based on a required power value of the first working coil;

determining the second target frequency of the second working coil based on a required power value of the second working coil;

calculating an absolute value of a difference between the first target frequency and the second target frequency; and determining a driving mode of the induction heating device based on the absolute value of the difference between the first target frequency and the second target frequency.

5. The method of claim 4, wherein the step of determining the driving mode based on the absolute value of the difference between the first target frequency and the second target frequency, comprises:

determining the driving mode as a coupling mode when the absolute value of the difference between the first target frequency and the second target frequency is equal to or greater than a predetermined first reference value and less than a predetermined second reference value;

determining the driving mode as a dividing mode when the absolute value of the difference between the first target frequency and the second target frequency is equal to or greater than the second reference value and is less than or equal to a predetermined third reference value; and determining the driving mode as a normal mode when the absolute value of the difference between the first target frequency and the second target frequency is less than the first reference value or greater than the third reference value.

6. The method of claim 5, wherein when the driving mode is the coupling mode, the first final driving frequency and the second final driving frequency are set to the same value, when the driving mode is the dividing mode, the difference between the first final driving frequency and the second final driving frequency is set equal to or greater than the predetermined noise avoidance value, and when the driving mode is the normal mode, the first final driving frequency is set equal to the first target frequency, and the second final driving frequency is set equal to the second target frequency.

7. The method of claim 1, further comprising:

driving the first working coil and the second working coil at a predetermined adjusted frequency;

adjusting the predetermined adjusted frequency of the first working coil to a first target frequency of the first coil and adjusting the predetermined adjusted frequency of the second working coil to a second target frequency of the second coil;

determining a driving mode of the induction heating device; and adjusting the first target frequency of the first working coil to the first final driving frequency and adjusting the second target frequency of the second working coil to the second final driving frequency based on the determined driving mode.

8. The method of claim 7, wherein adjusting the predetermined adjusted frequency of the first working coil to the first target frequency of the first coil and adjusting the predetermined adjusted frequency of the second working coil to the second target frequency of the second coil are performed at different time.

9. The method of claim 1, wherein determining the first final driving frequency of the first working coil and the second final driving frequency of the second working coil again, comprises:

determining a driving mode of the induction heating device based on the required power value of the high-power working coil set to the predetermined minimum power value; and adjusting the first final driving frequency of the first working coil and adjusting the second final driving frequency the second working coil based on the determined driving mode.

10. An induction heating device, comprising:

a first working coil corresponding to a first heating area;

a second working coil corresponding to a second heating area; and a controller configured to respectively drive the first working coil and the second working coil, wherein, the controller is configured to determine a first target frequency of a first working coil and a second target frequency of a second working coil, determine a first final driving frequency of the first working coil and a second final driving frequency of the second working coil based on the first target frequency and the second target frequency; determine a high-power working coil and a low-power working coil among the first working coil and the second working coil based on the first final driving frequency and the second final driving frequency; acquire a temperature value of the high-power working coil when an absolute value of a difference between a first final driving frequency of the first working coil and a second final driving frequency of the second working coil is equal to or greater than a predetermined noise avoidance value, and when a final driving frequency of the low-power working coil differs from a target frequency of the low-power working coil; determine whether the temperature value of the high-power working coil satisfies a predetermined output change condition; set a required power value of the high-power working coil to a predetermined minimum power value when the temperature value satisfies the predetermined output change condition; and determine the first final driving frequency of the first working coil and the second final driving frequency of the second working coil again, wherein the predetermined minimum power value is lower than a power value corresponding to a target frequency of the high-power working coil.

11. The induction heating device of claim 10, wherein the controller is configured to determine that the predetermined output change condition is satisfied when the temperature value is equal to or greater than a predetermined reference temperature value.

12. The induction heating device of claim 10, wherein the controller is configured to determine that the predetermined output change condition is satisfied when the temperature value is maintained within a range of predetermined reference temperatures for a predetermined reference period.

13. The induction heating device of claim 10, wherein the controller is configured to determine the first target frequency of the first working coil based on a required power value of the first working coil; determine the second target frequency of the second working coil based on a required power value of the second working coil; calculate an absolute value of a difference between the first target frequency and the second target frequency; and determine a driving mode of the induction heating device based on the absolute value of the difference between the first target frequency and the second target frequency.

14. The induction heating device of claim 13, wherein the controller is configured to determine the driving mode as a coupling mode when the absolute value of the difference between the first target frequency and the second target frequency is equal to or greater than a predetermined first reference value and less than a predetermined second reference value; determine the driving mode as a dividing mode when the absolute value of the difference between the first target frequency and the second target frequency is equal to or greater than the second reference value and is less than or equal to a predetermined third reference value; and determine the driving mode as a normal mode when the absolute value of the difference between the first target frequency and the second target frequency is less than the first reference value or greater than the third reference value.

15. The induction heating device of claim 14, wherein when the driving mode is determined as the coupling mode, the controller is configured to set the first final driving frequency and the second final driving frequency to the same value;

when the driving mode is determined as the dividing mode, the controller is configured to set a difference between the first final driving frequency and the second final driving frequency equal to or greater than the predetermined noise avoidance value; and when the driving mode is determined the normal mode, the controller is configured to set the first final driving frequency equal to the first target frequency, and set the second final driving frequency equal to the second target frequency.

16. The induction heating device of claim 10, wherein the controller is configured to:

drive the first working coil and the second working coil at a predetermined adjusted frequency;

adjust the predetermined adjusted frequency of the first working coil to a first target frequency of the first coil and adjust the predetermined adjusted frequency of the second working coil to a second target frequency of the second coil;

determine a driving mode of the induction heating device; and adjust the first target frequency of the first working coil to the first final driving frequency and adjust the second target frequency of the second working coil to the second final driving frequency based on the determined driving mode.

17. The induction heating device of claim 16, wherein determining the first final driving frequency of the first working coil and the second final driving frequency of the second working coil again, the controller is configured to:

determine a driving mode of the induction heating device based on the required power value of the high-power working coil set to the predetermined minimum power value; and adjust the first final driving frequency of the first working coil and adjust the second final driving frequency the second working coil based on the determined driving mode.

18. A non-transitory medium containing instructions therein, which when executed by an electronic processor causes the electronic processor to perform a method, comprising:

determining a first target frequency of a first working coil corresponding to a first heating area and a second target frequency of a second working coil corresponding to a second heating area;

determining a first final driving frequency of the first working coil and a second final driving frequency of the second working coil based on the first target frequency and the second target frequency;

determining a high-power working coil and a low-power working coil among the first working coil and the second working coil based on the first final driving frequency and the second final driving frequency;

acquiring a temperature value of the high-power working coil, when an absolute value of a difference between a first final driving frequency of the first working coil and a second final driving frequency of the second working coil is equal to or greater than a predetermined noise avoidance value, and when a final driving frequency of the low-power working coil differs from a target frequency of the low-power working coil;

determining whether the temperature value of the high-power working coil satisfies a predetermined output change condition;

setting a required power value of the high-power working coil to a predetermined minimum power value when the temperature value satisfies the predetermined output change condition; and determining the first final driving frequency of the first working coil and the second final driving frequency of the second working coil again, wherein the predetermined minimum power value is lower than a power value corresponding to a target frequency of the high-power working coil.

19. The non-transitory medium of claim 18, further comprising:

determining a first target frequency of the first working coil based on a required power value of the first working coil;

determining a second target frequency of the second working coil based on a required power value of the second working coil;

calculating an absolute value of a difference between the first target frequency and the second target frequency; and determining a driving mode of the induction heating device based on the absolute value of the difference between the first target frequency and the second target frequency.

20. The non-transitory medium of claim 19, wherein when the driving mode is the coupling mode, the first final driving frequency and the second final driving frequency are set to the same value, when the driving mode is the dividing mode, the difference between the first final driving frequency and the second final driving frequency is set equal to or greater than the predetermined noise avoidance value, and when the driving mode is the normal mode, the first final driving frequency is set equal to the first target frequency, and the second final driving frequency is set equal to the second target frequency.

* * * * *